United States Patent [19]

Hattori et al.

[11] Patent Number: 4,695,242
[45] Date of Patent: Sep. 22, 1987

[54] PLUNGER MOLDING MACHINE HAVING BLANK LOADING DEVICE

[75] Inventors: Isao Hattori, Nagoya; Hifuo Noiri, Hashima, both of Japan

[73] Assignee: NGK Insulators, Ltd., Japan

[21] Appl. No.: 911,384

[22] Filed: Sep. 25, 1986

[30] Foreign Application Priority Data

Oct. 4, 1985 [JP] Japan .......................... 60-151459[U]

[51] Int. Cl.$^4$ .......................... B28B 3/24; B29C 47/10
[52] U.S. Cl. .......................... 425/376 R; 100/188 R; 264/176.1; 414/16
[58] Field of Search .......................... 425/112, 178, 176 R, 425/DIG. 128, 38, 64, 114, 253; 264/323, 176.1; 100/179, 188 R, 189; 414/16, 18; 72/263; 366/332, 333, 256, 69

[56] References Cited

U.S. PATENT DOCUMENTS

| | | | |
|---|---|---|---|
| 3,898,831 | 8/1975 | Kahlefeld | 425/376 |
| 4,334,466 | 6/1982 | Spiegelberg | 100/188 R |
| 4,565,512 | 1/1986 | Wills et al. | 264/142 |

*Primary Examiner*—Jay H. Woo
*Assistant Examiner*—Karl Sturge
*Attorney, Agent, or Firm*—Parkhurst & Oliff

[57] ABSTRACT

A plunger molding machine includes a material cylinder having at one end an extending die for extruding a blank therethrough and pivotally movable about a pivotal axis on a side of the extending die by means of a cylinder tilting mechanism, a piston having a size engageable in the material cylinder, and a hydraulic plunger for driving the piston. The plunger molding machine comprises a blank loading device arranged in parallel with moving directions of the piston for molding. The blank loading device comprises a blank receiving platform for receiving the blank to be molded, a chuck mechanism for preventing the blank on the platform from being dislodged therefrom, a platform tilting mechanism for tilting the platform, and a platform traversing mechanism for moving the platform in translational motion onto a side of the material cylinder to bring an axis of said blank receiving platform into alignment with that of said material cylinder. When the chuck mechanism is released, the blank is loaded into the material cylinder by gravity. In this manner, the plunger molding machine is able to carry out the loading the blank automatically by means of the exclusive loading device.

6 Claims, 3 Drawing Figures

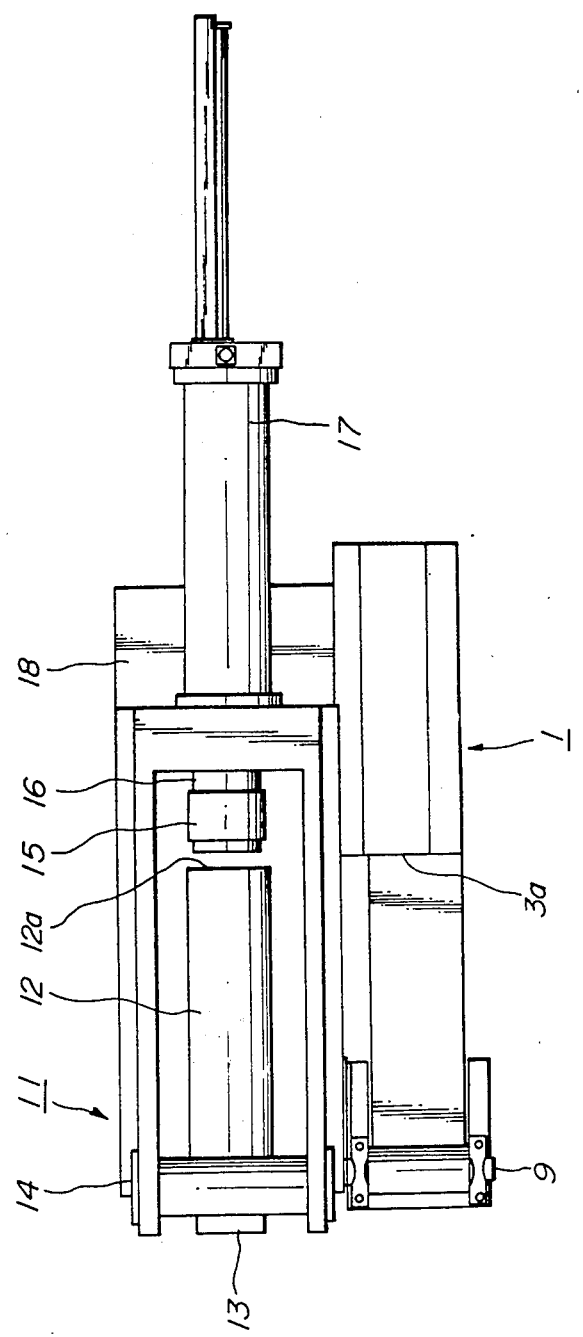
FIG_1a

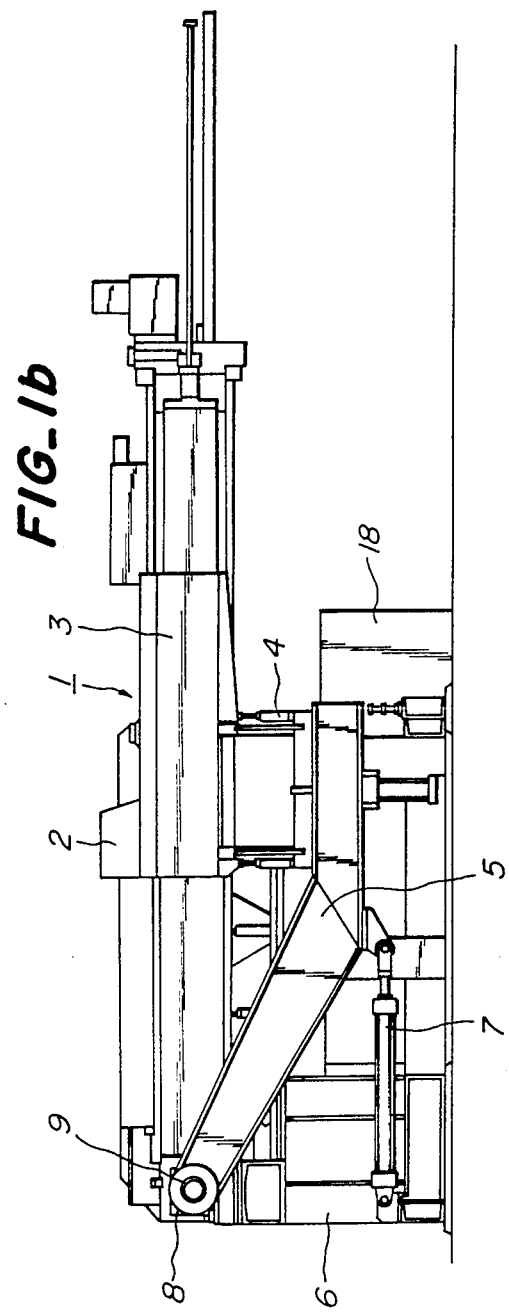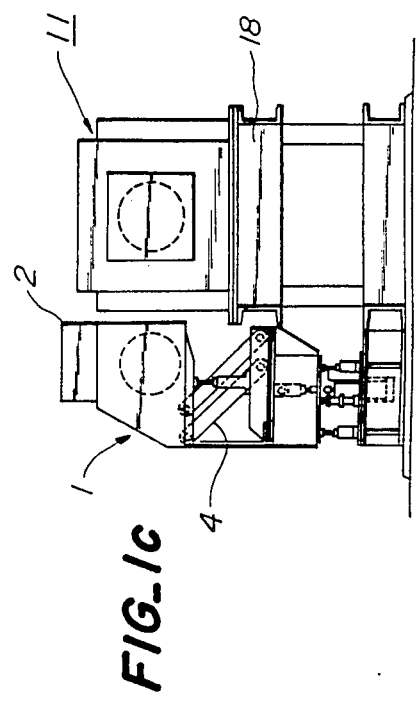

PLUNGER MOLDING MACHINE HAVING BLANK LOADING DEVICE

BACKGROUND OF THE INVENTION

This invention relates to a plunger molding machine for extruding a blank of a ceramic material therefrom to mold a formed product, and more particularly a plunger molding machine having a blank loading device capable of automatically loading a blank into the plunger molding machine.

With a conventional plunger molding machine for use in extruding a blank, every time when one blank has been extruded, a piston is removed from a material cylinder and after the material cylinder is tilted, a new blank is manually loaded into the tilted cylinder.

However, such a manual loading operation is troublesome and time-consuming and requires great skill. Moreover, such a manual operation often becomes impossible in the event that blanks to be loaded are heavy and bulky.

SUMMARY OF THE INVENTION

It is a principal object of the invention to provide a plunger molding machine having a blank loading device, which eliminates all the disadvantages of the prior art and is able to carry out loading blanks automatically by means of the exclusive loading device.

In order to achieve this object, a plunger molding machine including a material cylinder having at one end an extending die for extruding a blank therethrough and pivotally movable about a pivotal axis provided on a side of the extending die by means of cylinder tilting means, a piston having a size enabling the piston to telescopically slide in the material cylinder, and a fluid plunger for driving the piston according to the invention comprises a blank loading device arranged in parallel with moving directions of said piston for molding, and said blank loading device comprises a blank receiving platform for receiving the blank to be molded, chuck means for preventing the blank on said blank receiving platform from being dislodged therefrom, platform tilting means for tilting said blank receiving platform, and platform traversing means for moving said blank receiving platform in translational motion onto a side of said material cylinder to bring an axis of said blank receiving platform into alignment with that of said material cylinder.

In a preferred embodiment, the fluid plunger for driving the piston is a hydraulic plunger.

Pivotal axes of the material cylinder and the platform tilting means are preferably located in alignment with each other.

The platform tilting means preferably comprises at least one hydraulic cylinder whose one end is pivotally connected to a stationary member of the machine.

In a preferred embodiment, the platform traversing means comprises parallel links for driving the blank receiving platform in translational motion.

With the above arrangement according to the invention, the blank loading device is arranged in parallel with the plunger molding machine. After the material cylinder of the plunger molding machine and the blank receiving platform of the blank loading device have been rotated about the same pivotal axis through a predetermined angle, the blank receiving platform is moved in translational motion by means of the platform traversing mechanism so as to bring the axis of the blank receiving platform into alignment of that of the material cylinder to load a blank into the material cylinder by gravity by releasing the chuck means. In this manner, all the loading operations are automatically effected.

In order that the invention may be more clearly understood, preferred embodiments will be described, by way of example, with reference to the accompanying drawings.

BRIEF DESCRIPTION OF THE DRAWINGS

FIG. 1a is a plan view illustrating one embodiment of a plunger molding machine according to the invention;

FIG. 1b is a front elevation of the machine shown in FIG. 1a; and

FIG. 1c is a side view of the machine shown in FIG. 1a.

DESCRIPTION OF THE PREFERRED EMBODIMENTS

FIGS. 1a, 1b and 1c are a plan, a front and a side view illustrating one embodiment of the plunger molding machine with a blank loading device according to the invention. In this embodiment, the blank loading device 1 comprises a blank receiving platform 3 having a chuck mechanism 2 for controlling blank loading operation, and a blank receiving platform tilting mechanism 5 to which the platform 3 is secured through a platform traversing mechanism 4. In this embodiment, the platform tilting mechanism comprises parallel links as shown in FIG. 1c. The platform tilting mechanism 5 is provided at a lower end with a hydraulic cylinder 7 whose one end is pivotally connected to a base 6 which is one part of a base 18, for driving the platform tilting mechanism 5. One end of the platform tilting mechanism 5 opposite to the end having the platform 3 is rotatably supported by the base 6 by means of a bearing 8 and a support shaft 9 passing therethrough. With this arrangement, when the hydraulic cylinder 7 is actuated, the blank receiving platform 3 is rotated about the support shaft 9 through a predetermined angle with the aid of the platform tilting mechanism 5 into a tilted position.

Under this condition, when the platform traversing mechanism 4 is driven, the blank receiving platform 3 is moved into a position where the platform 3 is aligned with an axis of a material cylinder 12 of the plunger molding machine 11 as clearly shown in FIG. 1c.

As shown in FIGS. 1a-1c, the plunger molding machine 11 comprises a material cylinder 12 having at one end an extruding die 13 for extruding and rotatable about a pivotal shaft 14 provided on a side of the extending die 13 by means of a cylinder driving or tilting mechanism, a piston 16 having a size engageable in an interior of the material cylinder 12 and having at distal end an evacuating cap 15, and a hydraulic plunger 17 for driving the piston 16. These members are located on the base 18. With the arrangement above described, a cylindrical blank of a ceramic material is loaded into the material cylinder 12 by means of a blank loading device 1. Thereafter, the piston 16 is driven into the material cylinder 12 by actuating the hydraulic plunger 17 so as to extrude the blank through the extending die 13 to obtain a desired molded product.

As shown in FIG. 1, the blank loading device 1 and the plunger molding machine 11 are arranged side by side. In this case, it is required that an axis of the blank receiving platform 3 of the blank loading device 1 is in parallel with an axis of the material cylinder 12 of the plunger molding machine 11. The support shaft 9 as a pivotal center of the blank receiving platform 3 is aligned with the pivotal shaft 14 as a pivotal center of the material cylinder 12. Moreover, when the blank receiving platform 3 and the material cylinder 12 are rotated through the same angle to bring their axes into alignment with each other by means of the platform traversing mechanism 4, the plunger molding machine 11 is ready for loading the blank. The blank receiving platform 3 and the material cylinder 12 are arranged such that loading openings 3a and 12a of the platform 3 and the material cylinder 12 are positioned adjacent to each other with some clearance when the plunger molding machine 11 is under such a condition ready for loading the blank.

The operation of the plunger molding machine having the blank loading device as above described according to the invention will be explained hereinafter. When the material cylinder 12 and the blank receiving platform 3 are in their original positions where they have not pivotally rotated, a cylindrical blank of a ceramic material are supplied into the blank receiving platform 3 of the blank loading device 1 by means of a blank feeding device (not shown). The supplied blank piece is grasped by the chuck mechanism 2. The material cylinder 12 in which the piston 16 is not inserted is then rotated about the pivotal shaft 14 through a predetermined angle by means of the cylinder tilting mechanism, while the blank receiving platform 3 is rotated about the support shaft 9 through the same predetermined angle by means of the platform tilting mechanism 5. This rotating angle is needed only to enable the blank piece to slide on the platform 3 by gravity. An angle of the order of, for example, 45° is preferable. From this condition, the platform traversing mechanism 4 is actuated to bring axes of the blank receiving platform 3 and the material cylinder 12 into alignment with each other, so that the loading openings 3a and 12a are located in the adjacent position. Under such a condition, when the chuck mechanism is released, the blank piece is loaded into the material cylinder 12 by gravity. The blank receiving platform 3 and the material cylinder 12 are then returned to their original positions. Thereafter, the blank is extruded according to the conventional manner.

As can be seen from the above explanation, the plunger molding machine having the blank loading device according to the invention is able to carry out the loading a blank into the material cylinder automatically by means of the exclusive loading device. Therefore, the plunger molding machine according to the invention can effect the loading operation simpler and with a higher accuracy than in conventional manual loading operation and enables even a heavy and bulky blank to be loaded into the material cylinder with ease.

It is further understood by those skilled in the art that the foregoing description is that of preferred embodiments of the disclosed machines and that various changes and modifications may be made in the invention without departing from the spirit and scope thereof.

What is claimed is:

1. A plunger molding machine including a material cylinder having at one end an extending die for extruding a blank therethrough and pivotally movable about a pivotal axis provided on a side of the extending die by means of cylinder tilting means, a piston having a size enabling the piston to telescopically slide in the material cylinder, and a fluid plunger for driving the piston, comprising a blank loading device arranged in parallel with moving directions of said piston for molding, and said blank loading device comprising a blank receiving platform for receiving the blank to be molded, chuck means for preventing the blank on said blank receiving platform from being dislodged therefrom, platform tilting means for tilting said blank receiving platform, and platform traversing means for moving said blank receiving platform in translational motion onto a side of said material cylinder to bring an axis of said blank receiving platform into alignment with that of said material cylinder.

2. A plunger molding machine as set forth in claim 1, wherein said fluid plunger for driving the piston is a hydraulic plunger.

3. A plunger molding machine as set forth in claim 1, wherein pivotal axes of the material cylinder and the platform tilting means are located in alignment with each other.

4. A plunger molding machine as set forth in claim 1, wherein said platform tilting means comprises at least one hydraulic cylinder whose one end is pivotally connected to a stationary member of the machine.

5. A plunger molding machine as set forth in claim 1, wherein said platform traversing means comprises parallel links for driving the blank receiving platform in translational motion.

6. A plunger molding machine including a material cylinder having at one end an extending die for extruding a ceramic blank therethrough and pivotally movable about a pivotal axis provided on a side of the extending die by means of cylinder tilting means, a piston having a size enabling the piston to telescopically slide in the material cylinder, and a fluid plunger for driving the piston, comprising a blank loading device arranged in parallel with moving directions of said piston for molding, and said blank loading device comprising a blank receiving platform for receiving the blank to be molded, chuck means for preventing the blank on said blank receiving platform from being dislodged therefrom, platform tilting means for tilting said blank receiving platform, and platform traversing means for moving said blank receiving platform in translational motion onto a side of said material cylinder to bring an axis of said blank receiving platform into alignment with that of said material cylinder.

* * * * *